June 14, 1938.　　　　C. W. SINCLAIR　　　　2,120,633
METHOD OF FORMING WHEELS
Filed July 29, 1935　　　　2 Sheets-Sheet 1
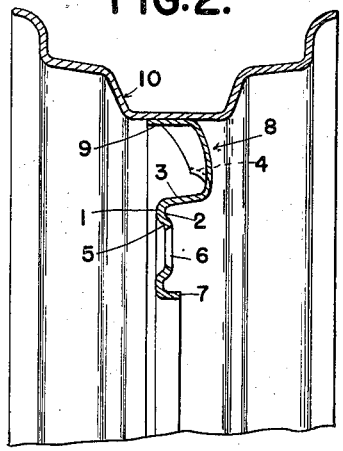
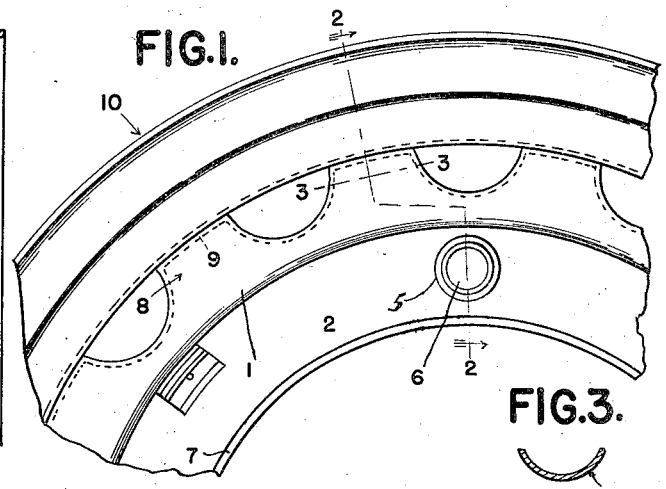
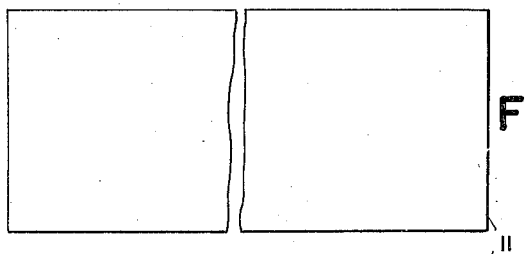
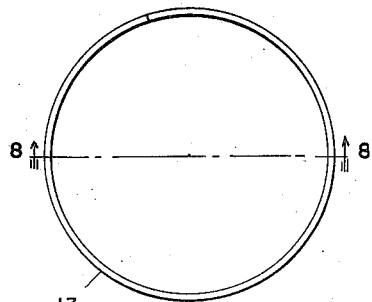
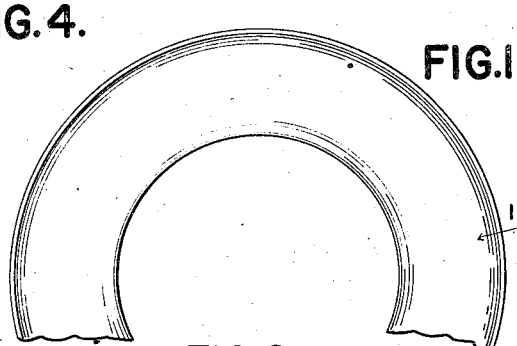
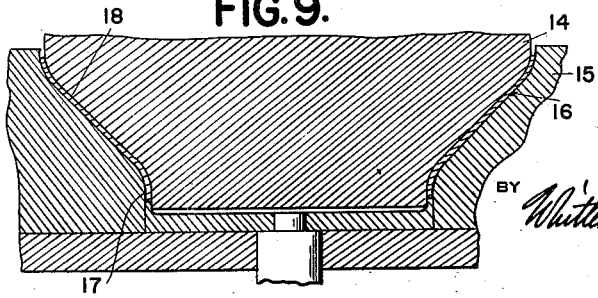
INVENTORS
CHARLES W. SINCLAIR
ATTORNEYS June 14, 1938.   C. W. SINCLAIR   2,120,633
METHOD OF FORMING WHEELS
Filed July 29, 1935   2 Sheets-Sheet 2
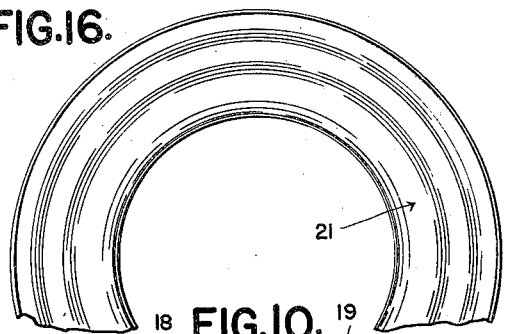
FIG.16.
FIG.10.
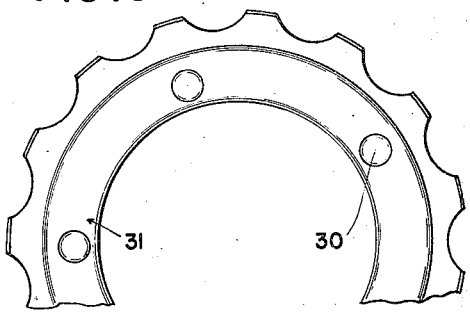
FIG.19.
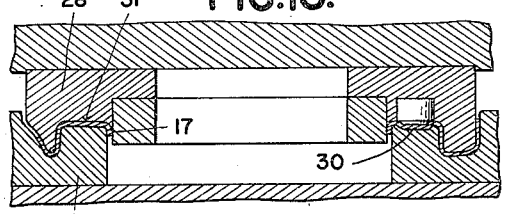
FIG.13.
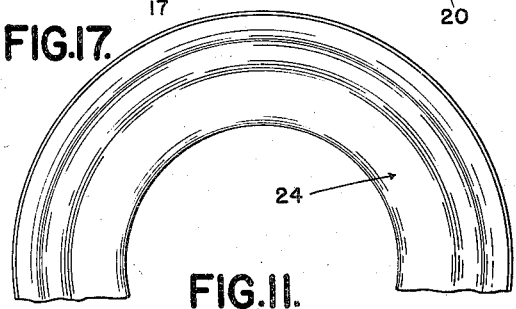
FIG.17.
FIG.11.
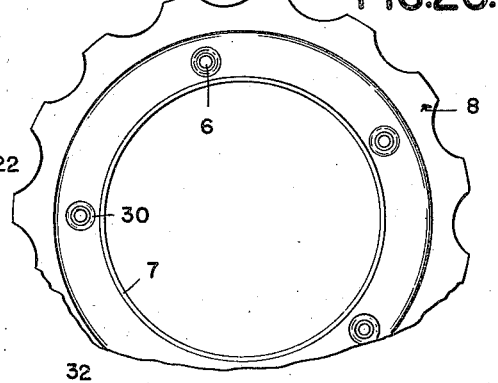
FIG.20.
FIG.14.
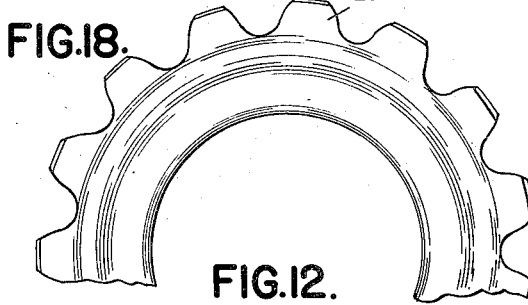
FIG.18.
FIG.12.
INVENTORS
CHARLES W. SINCLAIR
By *Whittemore Hulbert Whittemore Belknap*
ATTORNEYS Patented June 14, 1938

2,120,633

UNITED STATES PATENT OFFICE 2,120,633

METHOD OF FORMING WHEELS

Charles W. Sinclair, Detroit, Mich., assignor to Kelsey-Hayes Wheel Company, Detroit, Mich., a corporation of Delaware Application July 29, 1935, Serial No. 33,786

2 Claims. (Cl. 29—159.03)

The invention relates to the manufacture of sheet metal spoked vehicle wheels and refers more particularly to the manufacture of that type of wheel having spokes merging at their radially inner ends into a nave of relatively large diameter.

One of the objects of the invention is to avoid waste of stock. Another object is to facilitate the forming of the wheel with a varying radial section from a blank of uniform gauge. A further object is to simplify the operations required for completing the wheel.

These and other objects of the invention will become apparent from the following description, taken in connection with the accompanying drawings, in which—

Figure 1 is a fragmentary elevation of a wheel forming the product of my method;

Figures 2 and 3 are cross sections on the lines 2—2 and 3—3 respectively of Figure 1;

Figure 4 is an edge elevation of the original sheet metal blank;

Figure 5 is a plan view thereof;

Figures 6 and 7 are edge elevations illustrating certain of the succeeding steps;

Figure 8 is a cross section on the line 8—8 of Figure 7;

Figures 9, 10, 11, 12, 13 and 14 are sectional views illustrating successive steps;

Figures 15, 16, 17, 18, 19 and 20 are plan views of the blanks made in the steps of Figures 9, 10, 11, 12, 13 and 14 respectively.

While my invention is applicable to various modified constructions of sheet metal spoked vehicle wheels, I shall describe its application to the manufacture of the wheel illustrated in Figures 1, 2 and 3, which is of the following construction:

1 is the outer hub portion of the wheel comprising the radially extending bolting-on flange 2, the axially outwardly extending flange 3 extending from the outer periphery of the bolting-on flange, and the return-bent nave portion 4 extending from the axially outer end of the flange 3. The bolting-on flange is preferably provided with the axially outward depressions 5 formed with the central holes 6 for receiving the bolts used in securing the wheel to the inner hub. The bolting-on flange preferably terminates at its inner periphery in the axially outwardly extending flange 7. 8 are the spokes merging at their radially inner ends into the nave portion 4. These spokes are hollow and more particularly of channel cross section with the channels opening axially inwardly of the wheel. Furthermore, these spokes are free of each other at their radially outer ends and each is provided with the integral transverse flange 9 closing the radially outer end and forming a bearing for the tire carrying rim 10. The rim is suitably secured to the spokes as by spot-welding the base of the well of the rim to the flanges 9.

In forming a wheel such as described above from sheet metal, I originally start with the flat sheet metal strip 11 of uniform gauge and of indeterminate length, such as shown in Figures 4 and 5. This strip is sheared, as shown in Figure 6, to form the flat strip 12 of predetermined length, after which the strip 12 is bent into tube-like form and more particularly cylindrical form and its ends are then welded together. Then the weld flash, both inside and outside the blank and also at the edges, is trimmed, leaving the tube-like and more particularly cylindrical blank 13, as shown in Figures 7 and 8.

The blank 13 is pressed between the dies 14 and 15, as shown in Figure 9, to form the truncated cone-like blank 16. During this step, the dies preferably expand all of the blank 13 with the exception of the edge portion 17 and in doing so change the gauge of the metal to decrease toward the outer periphery or the periphery expanded to the greatest extent. It will thus be seen that the blank 16 has at one edge the cylindrical portion 17 of substantially uniform gauge and the flaring portion 18 of a gauge progressively decreasing in a direction away from the portion 17. The blank after this step is as shown in Figures 9 and 15. The blank is next pressed between the dies 19 and 20, as shown in Figure 10, to reversely bend the expanded portion 18. This step produces the blank 21, shown in Figures 10 and 16, of decreased axial dimension with the edges of the portion 17 and the portion 18 forming the limits.

The next step consists in further reversely bending the blank 21 by means of the dies 22 and 23, shown in Figure 11. The blank 24 after this step is as shown in Figures 11 and 17, its axial extent having been further decreased so that the edge of its portion 17 is now within its axial limits and its outer edge portion extends more nearly radially or more nearly at right angles to the axis of the blank. As illustrated in Figure 12, the outer edge portion of the blank is then trimmed to form the peripherally spaced scallops 25, the blank with these scallops being more clearly shown in Figure 18. This trimming step is carried out by means of the dies 26 and 27.

After this step, the scalloped blank is operated upon by the dies 28 and 29, which flatten the arcuate portion of the blank connecting into the axially extending portion 17 to form the bolting-on flange. The dies also refashion the conical portion of the blank connecting into the arcuate portion to make the same substantially cylindrical and to form the axially extending flange at the outer periphery of the bolting-on flange. The dies further bend the periphery of the blank to form the same with a continuous generally axially extending flange, thereby fashioning the scallops into the spokes of channel cross section closed at their radially outer ends by transverse flanges and also forming the return-bent nave portion. The dies still further form the depressions or bubbles 30 in the bolting-on flange. The blank 31 at this time is as shown in Figures 13 and 19. Suitable dies 32 and 33, illustrated in Figure 14, operate upon the depressions or bubbles 30 to pierce and countersink the same, the completed blank being shown in plan in Figure 20.

The blank is then assembled with the rim 10 and the base of the rim and the transverse flanges at the radially outer ends of the spokes are spot-welded to each other.

What I claim as my invention is:

1. The method of forming sheet metal spoked wheels, which comprises bending a sheet metal strip into tube-like form, securing the ends together, expanding a major portion of the tube-like blank into a substantially truncated cone-like blank, reversely bending and fashioning such cone-like blank into generally radially extending inner and outer portions and an intermediate generally axially extending portion, scalloping the outer portion and bending the side edges of the scallops in a generally axial direction to form spokes of channel section.

2. The method of forming sheet metal spoked wheels, which comprises bending a sheet metal strip into tube-like form, permanently securing the ends together, expanding a major portion of the tube-like blank into a substantially truncated cone-like blank, reversely bending and fashioning such cone-like blank into generally radially extending inner and outer portions and an intermediate generally axially extending portion, removing peripherally spaced portions of the outer portion and thereby forming openings and then bending the metal bordering the openings in a generally axial direction to form channel section spokes with the sides of adjacent spokes connected by a flange.

CHARLES W. SINCLAIR.